United States Patent [19]
Jackson

[11] 4,081,754
[45] Mar. 28, 1978

[54] PROGRAMMABLE TELEVISION RECEIVER CONTROLLERS

[76] Inventor: Joseph N. Jackson, 533 E. 169th St., Carson, Calif. 90746

[21] Appl. No.: 764,032

[22] Filed: Jan. 31, 1977

[51] Int. Cl.² ............... H04B 1/16; H01H 43/00
[52] U.S. Cl. .................. 325/396; 340/147 P; 340/309.4
[58] Field of Search ........... 325/396, 395, 464, 468; 340/147 P, 309.1, 309.4

[56] References Cited
U.S. PATENT DOCUMENTS

| | | | |
|---|---|---|---|
| 3,903,515 | 9/1975 | Haydon et al. | 340/309.4 |
| 4,031,470 | 6/1977 | Kokado et al. | 325/396 |

Primary Examiner—Benedict V. Safourek
Assistant Examiner—Marc E. Bookbinder
Attorney, Agent, or Firm—Blakely, Sokoloff, Taylor & Zafman

[57] ABSTRACT

Programmable television receiver controllers which may be manually programmed by a user to select or to limit the viewing selections for random times, typically in one-half hour intervals, throughout a predetermined time period such as a one week time period. Program selections may be made by setting suitable controls for the day, AM or PM, the half hour of the day and the channel desired, and entered into a memory by a pushbutton control. Thereafter a digital control clock automatically selects the pre-entered information at the appropriate times and provides a control signal to the channel selector of the television receiver. This signal may be used to automatically select the identified channels to the exclusion of all others, or in the alternative, to exclude the selected channel from selection manually at the receiver. Alternate embodiments include means for controlling other functions such as the ON-OFF function of the receiver.

10 Claims, 6 Drawing Figures

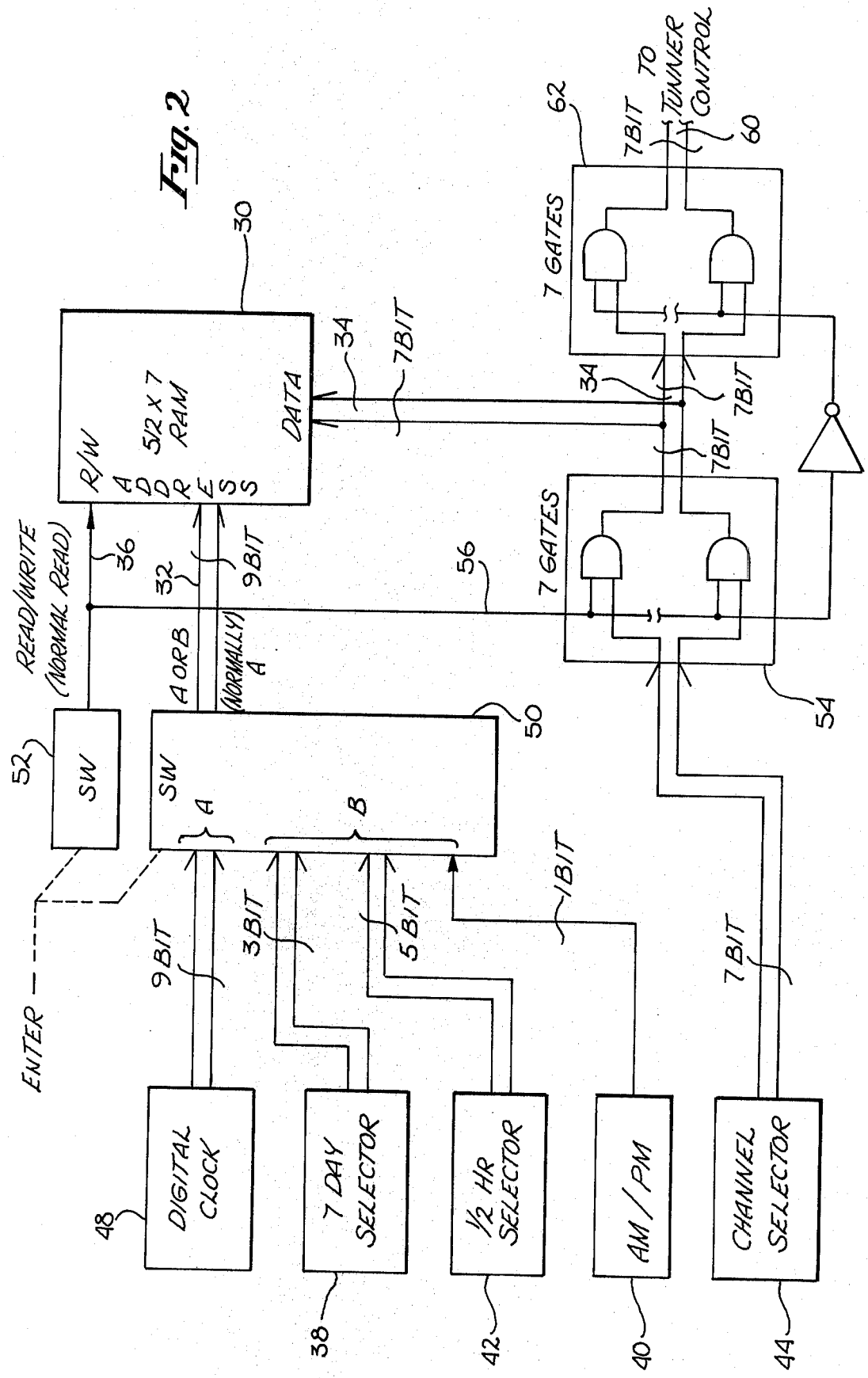

PROGRAMMABLE TELEVISION RECEIVER CONTROLLERS

BACKGROUND OF THE INVENTION

1. Field of the Invention

The present invention relates to the field of automatic controllers, and more particularly, to programmable controllers for use with television receivers and like equipment.

2. Prior Art

Many systems have been proposed for the automatic control of television receivers, that is, automatic channel selection for particular times of the day based upon programming information entered into the controller at some previous time. Most of these systems, however, are in substantial part mechanical systems which are not particularly easy to program, thereby being relatively expensive to manufacture and difficult to use. Accordingly, such systems have not enjoyed significant commerical use on conventional receivers.

Simple programmable television receiver controllers would provide a number of advantages over conventional channel selectors, and even over remote controlled channel selectors for a number of reasons. There may be programs of particular merit or interest which a viewer does not want to miss. However, the viewer's attention may inadvertently be drawn to another channel at the time, thereby failing to change channels to the more desirable program at the appropriate time. Also at the present time a number of programs and movies beng shown on T.V. are directed toward an adult audience, which programs may be undesirable or outright unsuitable for viewing by children, a situation which may only be expected to increase in the future. In addition, more and more homes have at least one television receiver controllable at least a substantial amount of the time by children, whereby with conventional channel selectors the "viewers discretion" cannot be exercised by a parent. Accordingly, a programmable controller could be programmed periodically, such as once a week, so that the receiver will automatically select those programs of highest merit or viewer interest, and/or to select predetermined unobjectionable programs at times when objectionable programming is being televised on other channels. As an alternative, of course, objectionable programming itself could be programmed for the purposes of locking out such programs from the viewer's selections, e.g. eliminating such programming from the channel selections accessible from the manual channel selector.

U.S. Pat. Nos. 3,215,798 and 3,388,308 disclose automatic television programming systems of the mechanical or electromechanical type, whereby a rotary device mechanically tied to a time clock is programmed to provide some physical movement indicative of the channel to be selected at that time. Devices of the same general type involving some form of motor driven switching unit are also disclosed in U.S. Pat. Nos. 2,755,424, 3,496,438, and 3,569,839. In all of these patents the mechanical complexity of the system disclosed is believed to preclude the widespread adoption thereof on receivers intended for consumer use. Further, most of these systems are operative on a number of switching signals equal to the number of selections desired, though some coding to somewhat reduce the complexity of such systems is known, such as that in U.S. Pat. No. 3,496,438. Also, obviously timing mechanisms of the electromechanical type for various other applications are also known, that disclosed in U.S. Pat. No. 3,603,961 being but one example of such devices.

BRIEF SUMMARY OF THE INVENTION

Programmable television receiver controllers which may be manually programmed by a user to select or to limit the viewing selections for random times, typically in one-half hour intervals, throughout a predetermined time period such as a one week time period. Program selections may be made by setting suitable controls for the day, AM or PM, the half hour of the day and the channel desired, and entered into a memory by a push-button control. Thereafter a digital control clock automatically selects the pre-entered information at the appropriate times and provides a control signal to the channel selector of the television receiver. This signal may be used to automatically select the identified channels to the exclusion of all others, or in the alternative, to exclude the selected channel from selection manually at the receiver. Alternate embodiments include means for controlling other functions such as the ON-OFF function of the receiver.

BRIEF DESCRIPTION OF THE DRAWINGS

FIG. 2 is a block diagram of the preferred embodiment of the present invention.

DETAILED DESCRIPTION OF THE INVENTION

The present invention comprises programmable television receiver controllers which may select, or alternatively prevent the selection of, specific television programs based upon previously entered program instructions. As shall subsequently be described in detail, the systems are particularly simple to fabricate, easy to program, and easy to interface with conventional television tuners, particularly the newer tuners having some form of numerical or push-button control.

For purposes of explanation of the invention, a preferred embodiment thereof will be described in detail, it being understood that variations thereof, etc. some of which will be also described, will become obvious given the fundamental concepts of the preferred embodiment. This preferred embodiment comprises a programmable television receiver controller for automatically determining (e.g. controlling the channel selector of the receiver as an over-ride to the manual selector) the channel selections for those viewing time periods for which it has been programmed. The purpose of such programming is to automatically present the desired preselected programs to the exclusion of those inadvertently selected at the time, and in the case of children, to prevent the viewing of objectionable programs by predetermining what may be viewed during the times one or more objectionable programs are being televised.

In the preferred embodiment, T.V. program selections covering time intervals of up to a week are entered into a memory, and then automatically selected by means of a digital control clock when the T.V. receiver is operating. Control of the ON-OFF function is not automated, though certainly it may be incorporated if desired. The program is selected by setting suitable controls for the day, AM or PM, the hour and half-hour of the day, and channel desired, with the selections being entered into memory by a push-button control. The selected channels are thus stored as input information using the particular half-hour time period as the address input for the memory, and are subsequently automatically selected by use of the digital output of the control clock as a memory address. Specific details of the design function and operation of the preferred embodiment are more fully described below, with specific reference to the drawings illustrating the invention.

Figure 1:
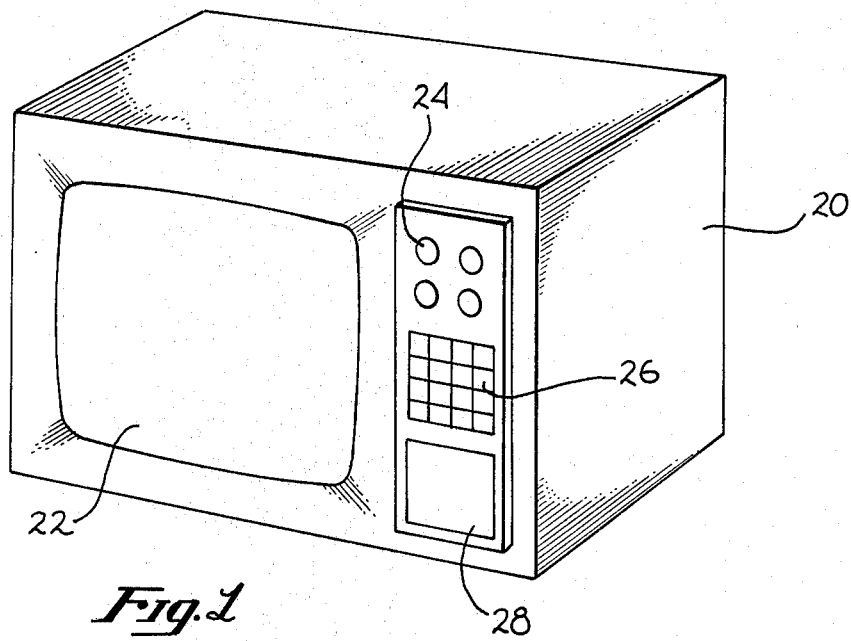
FIG. 1 is a perspective view of a typical receiver incorporating the present invention.

Now referring to FIG. 1, a perspective view of a television receiver or television set incorporating the present invention may be seen. It is to be understood that this figure is not intended to represent any specific manufacturer's current receiver, but instead is presented as a schematic representation of the general type of receiver now being offerred by a number of manufacturers. In particular, in addition to a generally rectangular enclosure 20 having a picture tube 22 visible from the front thereof, such receivers are characterized by some form of control panel which may include a first group of control switches and other adjustments 24, such as ON-OFF, volume, and picture controls and adjustments, and a keyborad matrix 26 for the push-button channel selection. In addition, the receiver shown in FIG. 1 also contains a small control panel 28 containing the cntrols for the programming, etc., in accordan'ce with the present invention.

Now referring to FIG. 2, a block diagram of one embodiment of the present invention may be seen. This particular embodiment utilizes a random access memeory means 30 having a 512 by 7 bit organization. Thus the memory, in addition to the usual power supply connections etc., is characterized by nine address input lines 32 to receive a nine bit binary coded address, and seven input/output lines 34 for receiving input signals and/or providing an output signal in accordance with information previously stored in the memory. Also provided is a read-write control line 36, the state of which determines whether the memory 30 will read out information on the output lines 34 in accordance with the address provided on lines 32, or alternatively will enter into memeory the information on the lines 34 in accordance with the memory location determined by the address provided on the lines 32.

Many different types of memory devices are suitable for use with the present invention. Of particular advantage however are semi-conductor memory devices, as such devices are small, and require little power and minimum support circuitry. Both static and dynamic memories could be used, though static memories are preferred as no refresh cycle is required, and the slightly higher power consumption which may be characteristic of such memories is of little significance with 110 volt power available. (Suitable memory devices are available from Intel, Mountain View California, and Texas Instruments and National Semiconductor, to name three of the well known manufacturers of such devices.) Also it should be noted that the organization of such memories is generally variable, and for that matter it may be desired to vary from the organization provided herein for reasons which will be subsequently mentioned. In fact, other forms of alterable storage devices may be used, such as shift registers, provided they are implemented as random access memory means, that is, organized to allow storage access based upon clock and manually set inputs.

The memory 30 is generally utilized as a translator in the present invention, translating the input information provided on the address lines 32 representating a particular program interval, to output information on lines 34 determining the particular channel selection for that time interval dependent upon the previous programming of the memory. As such, the memory translates a time period to a channel selection in accordance with a previously selected choice for that time interval. The various choices are entered in the memory by the control panel 28 on the receiver shown in FIG. 1.

Figure 3:
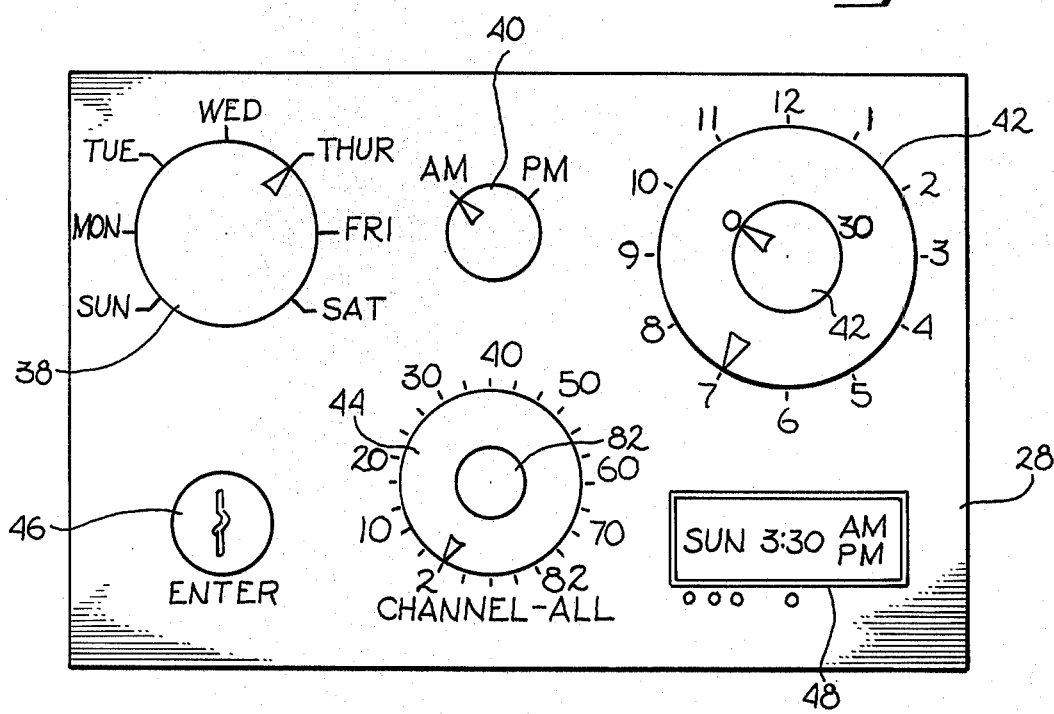
FIG. 3 is a face view shown in schematic form of the control panel of the present invention.

The control panel for programming the memory, the face of which is shown in detail in FIG. 3, is characterized by a first switch selector 38 for selecting the day of the week, a second switch selector 40 for selecting the morning or afternoon hours, a pair of switches 42 for selecting the hour and half-hour, and a channel selector switch 44 for selecting any of the eighty-two U.H.F. and V.H.F. channels. Entry of the selected information is made by a switch 46, which may be a key-operated switch to prevent subsequent alteration of the programmed information. Also presented on the face of the control panel is a clock 48 indicating the day of the week and time of the day, useful both as a convenience and for resetting of clock in the event power is interupted. These various controls 38 through 48 are also shown in the block diagram of FIG. 2. The day of the week or seven-day selector 38 provides a three-bit binary coded signal providing a maximum of an eight day cycle if desired (a seven day cycle being the usual). The half hour selector 42 is a 5 bit signal, with the AM/PM selector 40 40 providing an additional bit to designate between successive twelve hour periods. Thus the half hour selector 42 covering the twenty-four half hour periods in each half day is more than adequately covered by the 5 bit signal. Finally, the channel selector 44 in this embodiment, also providing a binary coded signal, may have all the U.H.F. and V.H.F. channels, that is, all 82 channels, which are more than adequately covered by the 7 bit signal. It is to be understood, however, that other forms of coding, or for that matter uncoded signals, may be used if desired. By way of example the channel selector 44 may be comprised of two side by side decimal switches, with the coding being binary coded decimal to give a possible range of selections from 00 to 99, again more than adequately covering the 82 channels available. (Some of these bits could be used to automate other functions if desired. By way of example, 00 might be used for an automatic turn-off, 01 as automatic turn-on; and/or 84 through 99 for such other functions as may be desired.) Binary coded decimal requires 4 bits for each digit, or a total of 8 bits, and would therefore require a 512 by 8 memory organization.

It should also be noted that uncoded channel selections may also be used if desired. In particular, certain T.V. receivers may have push-button or switching controls for a smaller number of channels selected from the 82 possible channels, the selections beng determined in accordance with the reception where the set is to be used. In this case the total number of selections available on any specific set may be sufficiently limited in number so that one bit may be assigned to each channel selection possible. Uncoding of the day and time of day is also a possibility, though most memories, particularly the semi-conductor memories commercially available at the present time at relatively low cost and in large quantities, include their own decoders, and uncoded time signals would probably require too many bits to be practical.

In the embodiment shown in FIG. 2, the digital clock 48 provides a 9 bit binary coded time signal advancing each one half hour, with the seven day selector, the half hour selector and the AM/PM selector providing time selections of the same format and corresponding to the equivalent future output of the clock. A switching unit, shown schematically as block 50, selects between the current time signal provided by the digital clock 48, and a future time signal determined by the day and time selectors, e.g., the 9 bit signals (A) or the 9 bit signals (B), and provides either of these signals to the memory 30 as the 9 bit address input. Normally switch block 50 (an electronic or mechanical switch) will communicate the output of the digital clock to the memory address input, though upon mechanical or manual actuation of the enter switch 46, will change to communicate the future selected time to the address input. At the same time a switch 52 changes to signal on the read-write input 36 of the memory 30 from a read signal to a write signal, writing in the information then provided by the channel selector 44. In that regard it will be noted that the output of the channel selector 44 is coupled to an appropriate number of AND gates 54, with the gates being controlled by a signal on line 56 coupled to the read-write line. Thus only during the memory write operation is the output of the channel selector 44 coupled to the data input/output lines 34 of the memory. Further, the same signal on line 56 is coupled through an inverter 58 which decouples the information on lines 34 from the controller output on lines 60 used for the turner controller by disabling ANd gates 62. Thus during programming the various selections being programmed are decoupled from the turner controller so as to not interfere with the current operation of the receiver (if then being used).

Having now described the general organization and interconnection of the preferred form of the present invention, an explemary programming step will now be described. Assume one always wants to watch toe 6:00 P.M. news every week day on channel 5. In this case the seven day selector 38 is set to Monday, the half-hour selector 42 is set to 6:00, the AM/PM selector is set to PM, and the channel selector is set to channel 5. On depression of the enter switch the output of the memory on lines 34 is decoupled from the cntroller output lines 60, the address for the particular half hour selected is provided to the memory, the output of the channel selector is coupled to the input/output lines 34 of the memory, and a write signal is directed to the memory to store the channel selection at the appropriate address. Obviously, to program for the remaining days of the week the seven day selector 38 is merely advanced through all of the desired days, the enter switch 46 being actuated for each day that that particular program is desired.

Figure 4:
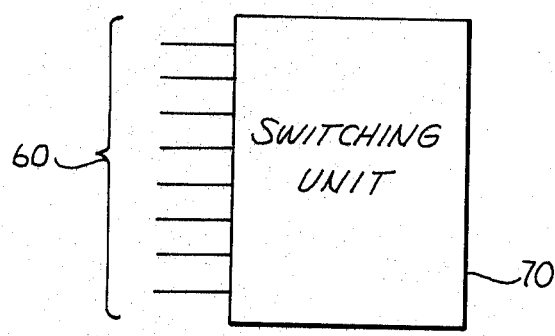
FIGS. 4, 5 and 6 are block diagrams illustrating various forms of implementation of the present invention to prior art tuners.
Figure 5:
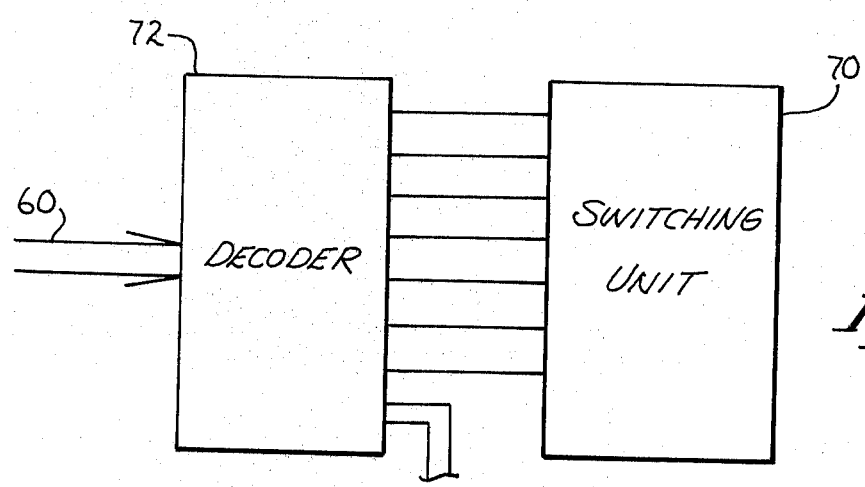
Figure 6:
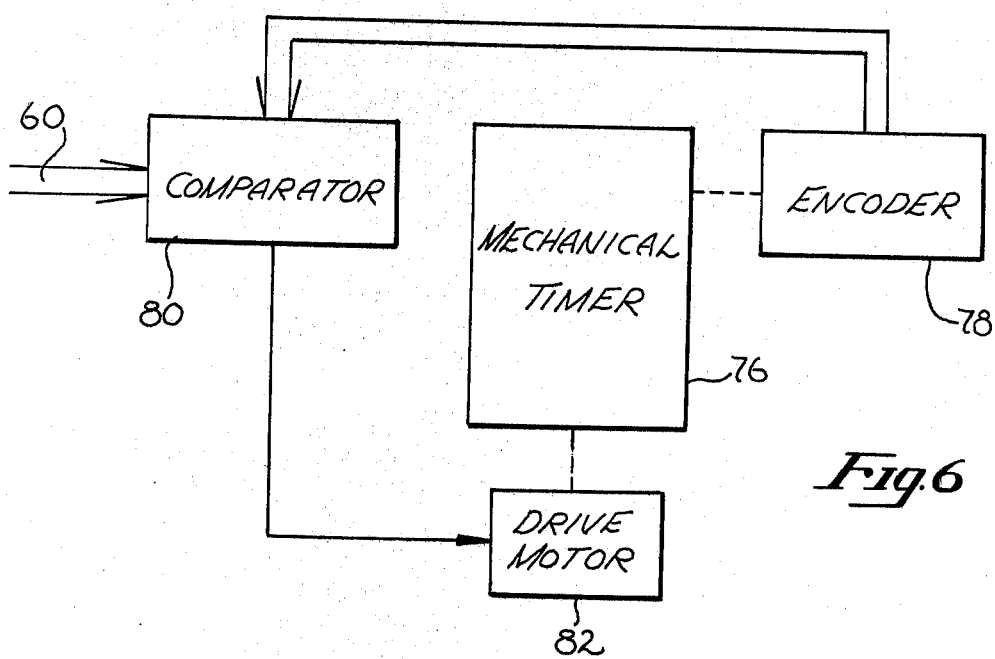

Now referring to FIGS. 4, 5 and 6, three exemplary forms of implementing the control signals on line 60 may be seen. In FIG. 4, illustrating the implementation for a system wherein the channel selection information is uncoded, a simple switching unit 70 to control a switch type selector may be used. Such switching units may be relays or semi-conductor switches as desired. For systems utilizing coded channel information such as binary or binary coded decimal information, a decoder 72 is interposed between the lines 60 and the switching unit 70 to decode the selection, as shown in FIG. 5. It should be noted that if the number of possible channel selections is less than the number of combinations provided by the code, additional decoded outputs may be provided by the decoder 72, such as on lines 74 for such purposes as implementing the ON/OFF switch functions, etc. Finally in FIG. 6 an electromechanical system for operating a mechanical tuner 76 is shown. In this implementation the signals on lines 60, whether coded or uncoded, are compared with the output of an encoder 78 mechanically coupled to the mechanical tuner 76. A drive motor 82 coupled to the output of the comparator 80 is used to advance the position of mechanical tuner until coincidence is obtained between the signals on line 60 and the signals provided by the encoder 78.

As a further example of the implementation of the present invention, reference is hereby made to a publication of the Zenith Radio Corporation of Chicago, Illinois entitled "Technician Participation Workshop, TPW 4" dated June 1976. This publication provides technical information with respect to certain tuners used on their television receivers. On page 62 thereof, a 12 position push-button manual varactor tuning system is shown, together with the logic diagram and circuit therefor. This tuner utilizes twelve push-buttons to cover the range of channels from 2 to 13, and twelve potentiometer adjustments for the tuning to up to 12 U.H.F. channels. Each potentiometer adjustment is associated with one of the 12 push-buttons so that the 12 V.H.F. or up to 12 U.H.F. channels may be celected through the equivalent of 24 switch closures. Accordingly for the direct implementation of the present invention on a receiver using this tuning system, the switching unit 70 would provide the full range of tuner control possible for such receivers by providing these 24 switch closures automatically, either mechanically or electronically.

There has been described herein a new and unique television receiver controller which may be programmed as desired to select predetermined programming throughout a given time period, specifically one-week for the embodiment disclosed. Also various implementations of the preferred form of controller have been disclosed. It has also been mentioned that the present invention might be used to specifically exclude objectionable programming by eliminating the objectionable programming from the range of selections available at the manually operated tuner. This implementation may readily be accomplished in any method desired, such as by way of example, by implementing the system in accordance with FIG. 6 but operating the drive motor only upon the coincidence between the output of encoder 78 and the output of the controller on lines 60 rather than operating the motor until coincidence is achieved as hereinbefore described. It was also pointed out that by utilizing coded signals for the channel selection certain additional signals are available. By way of example, if a full 82 channel system is utilized in accordance with the block diagram of FIG. 2 which utilizes a 7 bit channel selection signal giving a possible 128 combinations, 46 additional control signals are potentially available. Of particular interest might be signals for controlling appliances such as lights, or for automating the ON/OFF function of the receiver. In this regard the question of whether the ON/OFF function of the receiver is to be automated may itself be programmed, so that some programs will come on automatically whereas other programs will only be selected if the receiver has been manually turned on. Further, additional signals might also be used for the control of other devices, such as by way of specific example, to provide ON/OFF controls for video recorders so that the desired programming may be automatically recorded at any time during the weekly cycle.

Obviously other embodiments of the present invention may readily be implemented. By way of specific example, batteries might be utilized so that the memory would be maintained upon loss of power if volatile memories were used, so that temporary loss of power or unplugging of the set would not result in any loss of programming. As an alternate, a cutout could be provided so as to disable the set upon loss of power, so that the set could not be operated again until reset (presumably reprogrammed also). Thus while a preferred embodiment of the present invention has been disclosed and described in detail herein, and various alternate embodiments thereof have been described, it will be understood by those skilled in the art that various changes in form and detail may be made therein without departing from the spirit and scope of the invention.

I claim:

1. A programmable television receiver controller comprising:
   a random access memory means having a first plurality of address input lines, a second plurality of data input/output lines, and at least one read/write control line;
   clock means for providing a plurality of time dependent output signals in a given format;
   control means input/output to said date output lines for controlling channel selection on a television receiver in response memory output signals on said data input/output lines and a read condition on said control line.
   first program means for manually selecting a future time period, and for providing a plurality of time programming output signals equal in number to said first plurality of address input lines of said memory means and of the same format as the output signals of said clock means;
   second program means for manually making a future channel selection corresponding to said future time period selected on said first program means, and for providing a plurality of channel programming output signals coupled to said data input/output lines of said memory means; and
   channel selection entry means for coupling said clock means to said address input lines when reading memory output signals or said first program means to said address lines when writing into said memory means for programming said memory means at address locations determined by said first program means with channel selections manually determined by said second program means when a write condition is provided on said control line.

2. The controller of claim 1 wherein said entry means is a manually controllable means for changing the coupling of said address input lines from said clock means to said first program means.

3. The controller of claim 1 further comprised of decoupling means for decoupling said control means when said write condition is provided.

4. The controller of claim 1 wherein said first plurality of address input lines are input lines for binary coded address signals and said clock means is a means for providing binary coded output signals responsive to time.

5. The controller of claim 4 wherein said clock means is a means for providing binary coded output signals which advance on one half hour intervals.

6. The controller of claim 5 wherein said binary coded ouput signals of said clock means are repetitive on a predetermined cycle.

7. The controller of claim 6 wherein said predetermined cycle is a seven day cycle.

8. The controller of clam 1 wherein said plurality of channel programming output signals of said second program means are binary coded signals, and wherein said control means includes means for selecting any one of a predetermined number of channels in response to a binary coded memory output signal.

9. The controller of clam 1 wherein said plurality of channel programming output signals of said second program means are uncoded signals.

10. A programmable television receiver controller comprising:
   a random access memory means having a first plurality of address input lines responsive to binary coded address signals to determine memory locations therein;
   at least one read/write control line,, and a second plurality of data input/output lines for entering data into said memory and for reading data out of said memory in accordance with the condition of said at least one read/write line;
   clock means for providing a plurality of time dependent binary coded output signals which advance on a predetermined interval and repeat on a predetermined cycle;
   control means coupled to said data input/output lines for controlling channel selection of a television receiver in response to memory output signals on said data input/output lines and a read condition on said control line;
   first program means for manually selecting a future time interval within said predetermined cycle, and for providing a plurality of time programming output signals equal in number to said first plurality of address input lines of said memory means and of the same format as the output signals of said clock means;
   second program means for manually making a future channel selection corresponding to said future time interval selected on said first program means, and for providing a plurality of channel programming output signals coupled to said data input /output lines of said memory means; and
   chanel selecton entry means for coupling said clock means to said address input lines when reading memory output signals or said first program means to said address lines when writing into said memory means for programming said memory means at address locations determined by said first program means with channel selections manually determined by said second program means when a write condition is provided on said control line.

* * * * *

UNITED STATES PATENT AND TRADEMARK OFFICE
CERTIFICATE OF CORRECTION

PATENT NO. : 4,081,754
DATED : March 28, 1978
INVENTOR(S) : Jospeh N. Jackson

It is certified that error appears in the above–identified patent and that said Letters Patent are hereby corrected as shown below:

| Column | Line | |
|---|---|---|
| 3 | 31 | "cntrols" should be -- controls --. |
| 5 | 36 | "ANd" should be -- AND --. |
| 5 | 44 | "toe" should be -- the --. |
| 5 | 50 | "cntroller" should be -- controller --. |
| 6 | 33 | "celected" should be -- selected --. |
| 7 | 37 | "input/output" should be -- coupled --. |
| 7 | 37 | "date" should be -- data --. |
| 7 | 37 | "output" should be -- input/output --. |
| 7 | 39 | Insert -- to -- after "response" and before "memory". |

UNITED STATES PATENT AND TRADEMARK OFFICE
CERTIFICATE OF CORRECTION

PATENT NO. : 4,081,754
DATED : March 28, 1978
INVENTOR(S) : Joseph N. Jackson

It is certified that error appears in the above-identified patent and that said Letters Patent are hereby corrected as shown below:

| Column | Line | |
|---|---|---|
| 7 | 41 | "." should be -- ; --. |
| 8 | 3 | Insert at beginning of line before "when", -- from said data output lines of said memory means --. |
| 8 | 32 | Delete the second occurrence of ",". |

Signed and Sealed this

Tenth Day of April 1979

[SEAL]

Attest:

RUTH C. MASON
Attesting Officer

DONALD W. BANNER
Commissioner of Patents and Trademarks